(12) United States Patent
Huang et al.

(10) Patent No.: US 11,924,495 B2
(45) Date of Patent: Mar. 5, 2024

(54) FAR-FIELD SPEECH SUPPORT WITH LENS FUNCTION AND ELECTRICAL DEVICE

(71) Applicant: SHENZHEN TCL DIGITAL TECHNOLOGY LTD., Shenzhen (CN)

(72) Inventors: Dingfa Huang, Shenzhen (CN); Haiyun Sun, Shenzhen (CN); Xiaoxu Dong, Shenzhen (CN); Jun Xiang, Shenzhen (CN)

(73) Assignee: SHENZHEN TCL DIGITAL TECHNOLOGY LTD., Shenzhen (CN)

( * ) Notice: Subject to any disclaimer, the term of this patent is extended or adjusted under 35 U.S.C. 154(b) by 146 days.

(21) Appl. No.: 17/757,933

(22) PCT Filed: Aug. 26, 2020

(86) PCT No.: PCT/CN2020/111282
§ 371 (c)(1),
(2) Date: Jun. 23, 2022

(87) PCT Pub. No.: WO2021/135298
PCT Pub. Date: Jul. 8, 2021

(65) Prior Publication Data
US 2023/0042660 A1 Feb. 9, 2023

(30) Foreign Application Priority Data

Dec. 30, 2019 (CN) .......................... 201922490044.8

(51) Int. Cl.
*G08C 23/04* (2006.01)
*H04N 21/422* (2011.01)

(52) U.S. Cl.
CPC .......... *H04N 21/422* (2013.01); *G08C 23/04* (2013.01)

(58) Field of Classification Search
CPC .................................. G08C 23/04; H05K 7/14
See application file for complete search history.

(56) References Cited

U.S. PATENT DOCUMENTS 8,388,160 B2 * 3/2013 Kasai ................ G02F 1/133606
349/64
8,736,228 B1 * 5/2014 Freed ...................... H02J 50/05
320/114

(Continued)

FOREIGN PATENT DOCUMENTS

CN 208477913 U 2/2019
CN 110493092 A 11/2019

(Continued)

OTHER PUBLICATIONS

International Search Report in International application No. PCT/CN2020/111282, dated Nov. 30, 2020.

(Continued)

*Primary Examiner* — Brian P Yenke
(74) *Attorney, Agent, or Firm* — PV IP PC; Wei Te Chung; Zhigang Ma

(57) ABSTRACT

A far-field speech support with a lens function and an electrical device are provided. The far-field speech support includes: a base, a far-field speech board installation portion disposed on the base and configured to install a far-field speech board, a transparent light guide plate disposed on a bottom side of the far-field speech board installation portion, a buckle structure disposed on the base and configured to install an infrared receiving head assembly, and an infrared reflective portion disposed corresponding to the transparent light guide plate and disposed below the infrared receiving head assembly. The far-field speech support acts as a lens, provides an installation space for the far-field speech board, and facilitates installation of the far-field speech board.

18 Claims, 3 Drawing Sheets

(56) References Cited

U.S. PATENT DOCUMENTS

| | | | |
|---|---|---|---|
| 9,435,926 B2* | 9/2016 | Yamamoto | H04R 1/028 |
| 9,462,340 B1* | 10/2016 | Mathurin | H04N 21/8106 |
| 9,736,415 B2* | 8/2017 | Suzuki | H04N 21/42204 |
| 10,381,008 B1* | 8/2019 | Ho | G06F 16/90332 |
| 10,819,937 B2* | 10/2020 | Bao | H04N 21/422 |
| 10,873,722 B2* | 12/2020 | Bergstrøm | F16M 11/22 |
| 11,641,547 B2* | 5/2023 | Zhou | H04R 1/025 |
| | | | 381/150 |
| 2005/0122439 A1* | 6/2005 | Chang | H04R 5/02 |
| | | | 348/825 |
| 2007/0103432 A1* | 5/2007 | Yee | G06F 3/0425 |
| | | | 345/156 |
| 2008/0284842 A1* | 11/2008 | Hu | H04N 13/296 |
| | | | 348/46 |
| 2012/0207333 A1* | 8/2012 | Chang | H04R 5/02 |
| | | | 381/306 |
| 2015/0212248 A1* | 7/2015 | Yamamoto | H04N 5/00 |
| | | | 398/180 |
| 2015/0229865 A1* | 8/2015 | Suzuki | H04N 21/42221 |
| | | | 348/734 |
| 2016/0099596 A1* | 4/2016 | Chien | H02J 7/00 |
| | | | 362/253 |
| 2018/0035186 A1 | 2/2018 | Litovsky et al. | |
| 2020/0190655 A1* | 6/2020 | Zhu | H10K 71/00 |
| 2022/0220989 A1* | 7/2022 | Cosgrove | H05K 7/14 |
| 2023/0088466 A1* | 3/2023 | Zhang | G09F 9/30 |
| | | | 359/238 |
| 2023/0359074 A1* | 11/2023 | Amin | G02B 1/115 |

FOREIGN PATENT DOCUMENTS

| | | |
|---|---|---|
| CN | 210839894 U | 6/2020 |
| WO | 2019022459 A1 | 1/2019 |

OTHER PUBLICATIONS

Written Opinion of the International Search Authority in international application No. PCT/CN2020/111282, dated Nov. 30, 2020.

* cited by examiner

FAR-FIELD SPEECH SUPPORT WITH LENS FUNCTION AND ELECTRICAL DEVICE

CROSS-REFERENCE

The present application claims priority to Chinese Patent Application No. 201922490044.8, titled "FAR-FIELD SPEECH SUPPORT WITH LENS FUNCTION AND ELECTRICAL DEVICE", filed on Dec. 30, 2019 with the China National Intellectual Property Administration, which is incorporated by reference in the present application in its entirety.

FIELD OF INVENTION

The present disclosure relates to the technical field of electrical devices, and particularly to a far-field speech support with a lens function and an electrical device.

BACKGROUND

Far-field speech is a function that integrates intelligent speech search to change user experience, realizes natural human-computer interaction, and allows users to "dialogue" with smart televisions or smart boxes from a long distance. Currently, a far-field speech board of a television is generally installed externally on a portion of the television, which will affect aesthetics of an entirety of the television. On one hand, a current improvement method is to install the far-field speech board in a front frame. In order that the far-field speech board does not affect a lens configured to reflect an infrared signal of a remote controller to an infrared receiving head, it is necessary to increase a volume of the front frame, which is not conducive to the aesthetics of the television. On the other hand, if the far-field speech board is still installed externally, the far-field speech board will affect the aesthetics of the entirety of the television.

Therefore, the prior art still needs to be improved and developed.

SUMMARY OF DISCLOSURE

In view of the aforementioned deficiencies in the prior art, a purpose of the present disclosure is to provide a far-field speech support with a lens function and an electrical device to solve a problem of inconvenient installation of a far-field speech board, and to realize the lens function.

The present disclosure provides the following technical solutions.

The present disclosure provides a far-field speech support with a lens function, which comprises:
- a base;
- a far-field speech board installation portion disposed on the base and configured to install a far-field speech board;
- a transparent light guide plate disposed on a bottom side of the far-field speech board installation portion;
- a buckle structure disposed on the base and configured to install an infrared receiving head assembly; and
- an infrared reflective portion disposed corresponding to the transparent light guide plate and disposed below the infrared receiving head assembly.

In an embodiment, the infrared reflective portion is integrally formed with the transparent light guide plate.

In an embodiment, a reflective surface of the infrared reflective portion has an inclined angle with a bottom surface of the transparent light guide plate.

In an embodiment, the far-field speech board installation portion is provided with a plurality of first through holes.

In an embodiment, the first through holes are configured as a plurality of microphone holes for the far-field speech board.

In an embodiment, the buckle structure is disposed on a side of the base away from the far-field speech board installation portion.

In an embodiment, the buckle structure comprises a locking plate and a limiting plate, and the locking plate and the limiting plate are oppositely disposed on the base.

In an embodiment, the locking plate is provided with a limiting groove and a first limiting portion, and the limiting plate is provided with a second limiting portion.

In an embodiment, the transparent light guide plate is provided with a support portion. The support portion is disposed between the locking plate and the limiting plate. The support portion is integrally formed with the transparent light guide plate and the infrared reflective portion.

In an embodiment, the support portion is disposed perpendicular to the transparent light guide plate.

In an embodiment, the transparent light guide plate, the infrared reflective portion, and the support portion are made of polycarbonate.

In an embodiment, the transparent light guide plate is disposed at a middle of the base.

In an embodiment, the base is provided with a first fixing portion, and the far-field speech board installation portion is provided with a second fixing portion.

In an embodiment, the base is provided with a plurality of third fixing portions, and each of the third fixing portions is provided with a second through hole.

The present disclosure further provides an electrical device comprising a far-field speech board, an infrared receiving head assembly, and the aforementioned far-field speech support with the lens function. The far-field speech board is disposed on the far-field speech board installation portion. The infrared receiving head assembly is disposed on the far-field speech support and is connected to the buckle structure.

In an embodiment, the far-field speech board is adhered to a back surface of the far-field speech board installation portion.

In an embodiment, the infrared receiving head assembly comprises an infrared receiving head and an infrared receiving head mounting plate. The infrared receiving head mounting plate is disposed on the buckle structure. The infrared receiving head is disposed on the infrared receiving head mounting plate.

In an embodiment, the infrared receiving head is disposed directly above the infrared reflective portion.

The present disclosure provides a far-field speech support with a lens function and an electrical device. The far-field speech support comprises: a base, a far-field speech board installation portion disposed on the base and configured to install a far-field speech board, a transparent light guide plate disposed on a bottom side of the far-field speech board installation portion, a buckle structure disposed on the base and configured to install an infrared receiving head assembly, and an infrared reflective portion disposed corresponding to the transparent light guide plate and disposed below the infrared receiving head assembly. When an infrared signal enters the far-field speech support, it passes through the transparent light guide plate, and then is reflected to an infrared receiving head through the infrared reflective portion. Therefore, the far-field speech support acts as a lens, which reduces the number of lenses. Furthermore, the far-field speech support provides an installation space for the far-field speech board, which facilitates installation of the far-field speech board.

Figure 1:
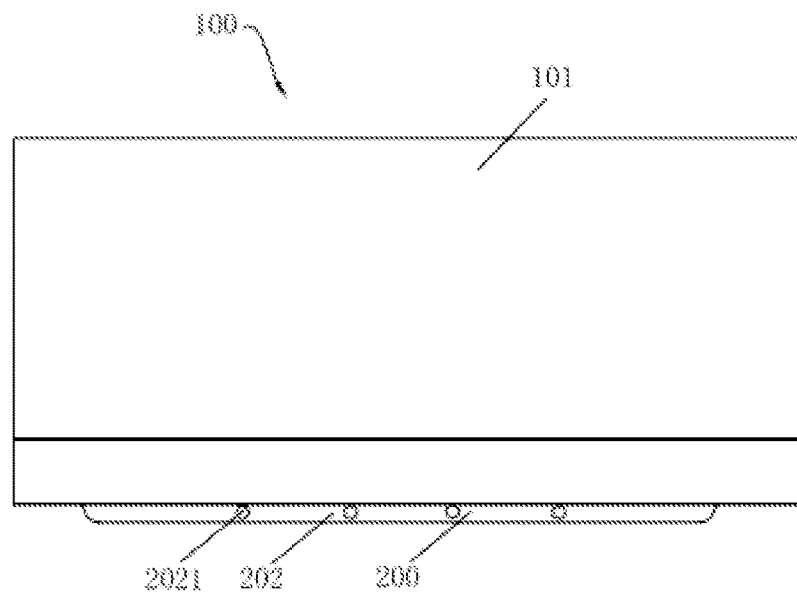
FIG. 1 is a schematic diagram of a television comprising a far-field speech support according to an embodiment of the present disclosure.

The above drawings have the following reference numerals: The drawings have the following symbols: 100, television; 101, television body; 102, front frame; 103, source cover plate; 200, far-field speech support; 201, base; 2011, transparent light guide plate; 202, far-field speech board installation portion; 2021, first through hole; 203, buckle structure; 2031, locking plate; 2032, limiting groove; 2033, first limiting portion; 2034, limiting plate; 2035, second limiting portion; 204, support portion; 205, infrared reflective portion; 2051, reflective surface; 206, first fixing portion; 207, second fixing portion; 208, third fixing portion; 2081, second through hole; 300, far-field speech board; 400, infrared receiving head assembly; 401, infrared receiving head mounting plate; and 402, infrared receiving head.

DETAILED DESCRIPTION

The present disclosure provides a far-field speech support with a lens function and an electrical device. The far-field speech support provided by the present disclosure is suitable for electrical equipment with far-field speech functions, such as televisions and commercial monitors. The far-field speech support is made of a transparent polycarbonate material. After an infrared signal enters the transparent far-field speech support, the transparent far-field speech support acts as a lens to reflect the infrared signal to an infrared receiving head. In order to make purposes, technical solutions, and effects of the present invention clearer and more definite, the present invention will be further described in detail below with reference to accompanying drawings and embodiments. It should be understood that specific embodiments described herein are only used to explain the present invention, not used to limit the present invention.

In embodiments and claims, terms "a/an" and "the", unless specifically defined herein otherwise, can generally refer to a single or plural form.

Furthermore, if a description of the embodiments of the present disclosure comprises terms such as "first" and "second", the terms such as "first" and "second" are used merely for a purpose of description, but shall not be construed as indicating or implying relative importance or implicitly indicating the number of the indicated technical feature. Hence, a feature defined with "first", "second", or the like may explicitly or implicitly includes one or more of this feature. In addition, technical solutions of the embodiments may be combined with each other, as long as those skilled in the art can realize such combination. When a combination of the technical solutions is contradictory or cannot be realized, it should be considered that such combination of the technical solutions does not exist, and does not fall within the claimed scope of the present disclosure.

Please refer to FIG. 1 to FIG. 5, the present disclosure describes an embodiment of applying a far-field speech support 200 to a television 100.

Figure 2:
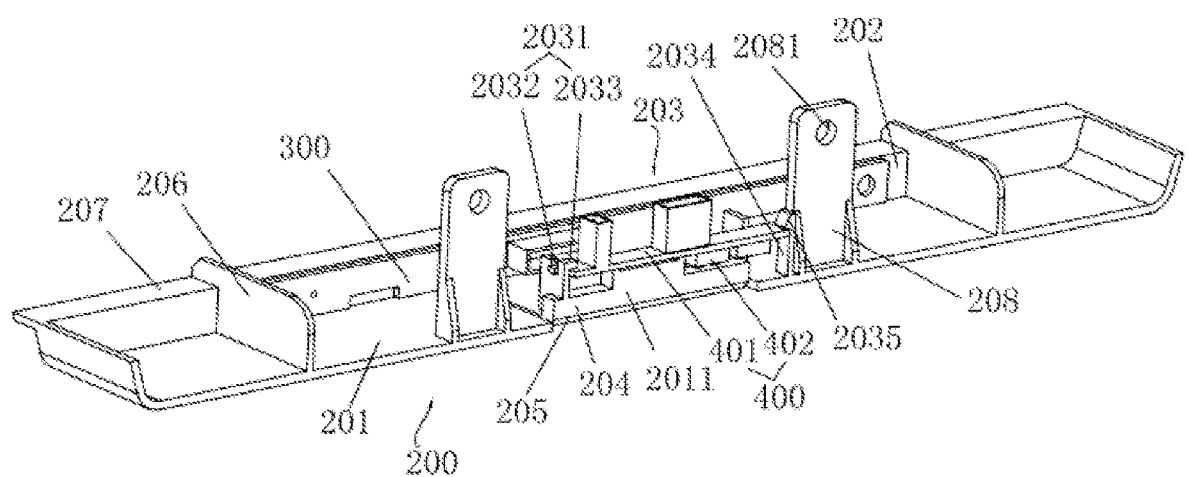
FIG. 2 is a schematic diagram of a combination of the far-field speech support, a far-field speech board, and an infrared receiving head assembly according to an embodiment of the present disclosure.
Figure 3:
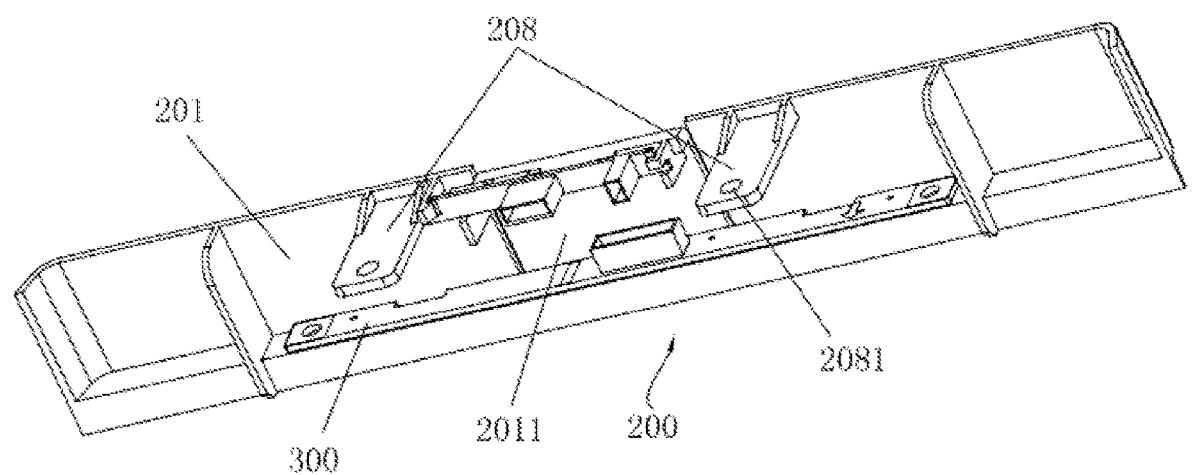
FIG. 3 is a schematic diagram of another view of the combination of the far-field speech support, the far-field speech board, and the infrared receiving head assembly according to an embodiment of the present disclosure.

As shown in FIG. 1, FIG. 2, and FIG. 3, the far-field speech support 200 with a lens function is applied to the television 100. The television 100 includes a television body 101, a far-field speech board 300, an infrared receiving head assembly 400, and the far-field speech stand 200. Specifically, the far-field speech support 200 is installed at a middle of a bottom of the television body 101, like a "slender chin", so that a protruding part of the far-field speech support 200 is very narrow and has a very slight influence on appearance.

Figure 4:
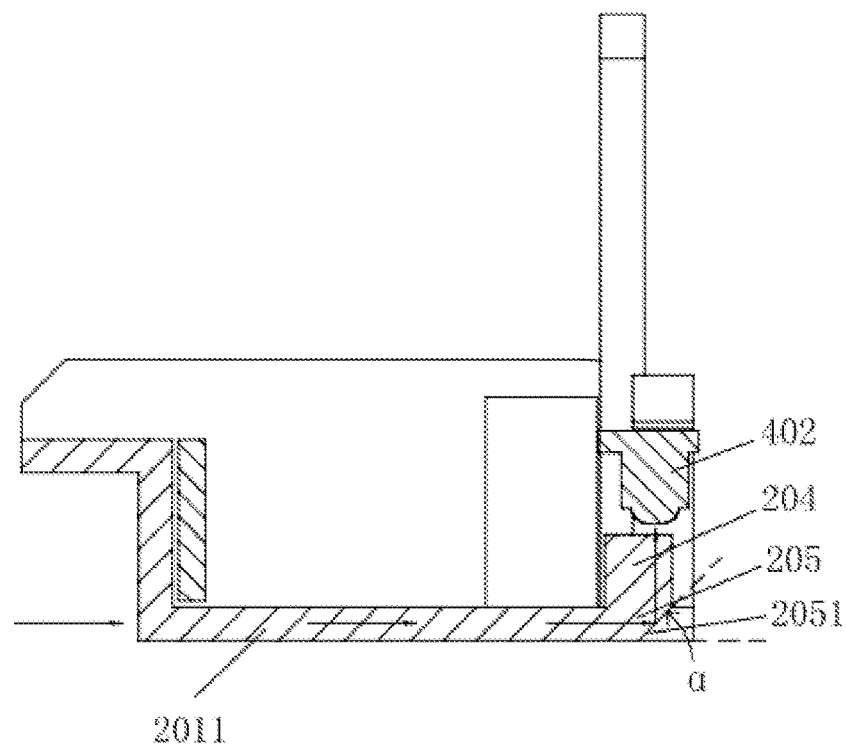
FIG. 4 is a schematic diagram showing that the far-field speech support realizes a lens function according to an embodiment of the present disclosure.

Specifically, please refer to FIG. 1, FIG. 2, and FIG. 4, the far-field speech support 200 comprises a base 201, a far-field speech board installation portion 202, a transparent light guide plate 2011, a buckle structure 203, and an infrared reflective portion 205. The far-field speech board installation portion 202 is vertically disposed on the base 201. The buckle structure 203 is disposed on a side of the base 201 away from the far-field speech board installation portion 202 and configured to install the infrared receiving head assembly 400. The transparent light guide plate 2011 is disposed on a bottom side of the far-field speech board installation portion 202. The transparent light guide plate 2011 is disposed at a middle of the base 201. The infrared reflective portion 205 is disposed corresponding to the transparent light guide plate 2011 and disposed below the infrared receiving head assembly 400. The infrared reflective portion 205 is integrally formed with the transparent light guide plate 2011. A reflective surface 2051 of the infrared reflective portion 205 has an inclined angle α with a bottom surface of the transparent light guide plate 2011. That is, the infrared reflective portion 205 is inclined in a direction away from the transparent light guide plate 2011 to form a chamfer with a high-gloss surface, i.e. a reflective mirror surface. The far-field speech board 300 is adhered on the far-field speech board installation portion 202 with a double-sided adhesive tape, such as a very high bond (VHB) tape, so that installation of the far-field speech board 300 is simpler. The infrared receiving head assembly 400 comprises an infrared receiving head 402 and an infrared receiving head mounting plate 401. The infrared receiving head mounting plate 401 is installed on the far-field speech support 200 and is connected to the buckle structure 203. The infrared receiving head 402 is disposed on the infrared receiving head mounting plate 401. The infrared receiving head 402 is disposed directly above the infrared reflective portion 205.

The infrared reflective portion 205 and the transparent light guide plate 2011 are both made of a transparent polycarbonate material. The transparent light guide plate 2011 and the infrared reflective portion 205 are transparent. After an infrared signal enters the transparent light guide plate 2011, the infrared signal reaches the infrared reflective portion 205. When the infrared signal reaches the reflective surface 2051 of the infrared reflective portion 205, that is, when the infrared signal reaches the high-gloss surface of the chamfer of the infrared reflective portion 205, the infrared signal is reflected to the infrared receiving head 402 by the reflective surface 2051, i.e., the high-gloss surface (the reflective mirror surface) of the chamfer, so that the infrared receiving head 402 can receive a signal sent by a remote controller. That is, the transparent light guide plate 2011 and the infrared reflective portion 205 of the far-field speech support 200 of the present disclosure function as lenses. This reduces the number of lenses and provides an installation space for the far-field speech board 300, thereby facilitating installation of the far-field speech board 300 and avoiding a conflict between the far-field speech board 300 and a lens. Compared with a current method for installing the far-field speech board 300, this method does not occupy space and is more aesthetically pleasing.

Please refer to FIG. 1, in an embodiment, the far-field speech board installation portion 202 is provided with a plurality of first through holes 2021. The first through holes 2021 are configured as a plurality of microphone holes of the far-field speech board 300, which can transmit sound, thereby realizing a far-field speech function. Furthermore, when the far-field speech board 300 is installed in a front frame 102 in the prior art, a front of the front frame 102 needs to be provided with a plurality of sound holes, which affects appearance. Compared with the prior art, a method for installing the far-field speech board 300 of the present disclosure is more aesthetically pleasing.

Please refer to FIG. 2, in an embodiment, the buckle structure 203 comprises a locking plate 2031 and a limiting plate 2034. Specifically, the locking plate 2031 and the limiting plate 2034 are oppositely disposed on the base 201. The locking plate 2031 is provided with a limiting groove 2032 and a first limiting portion 2033. The limiting plate 2034 is provided with a second limiting portion 2035.

Furthermore, the transparent light guide plate 2011 is provided with a support portion 204. The support portion 204 is disposed between the locking plate 2031 and the limiting plate2034. The support portion 204 is integrally formed with the transparent light guide plate 2011 and the infrared reflective portion 205. The support portion 204 is also made of the transparent polycarbonate material, so that the infrared signal reflected by the infrared reflective portion 205 can be transmitted to the infrared receiving head assembly 400 through the supporting portion 204. It should be noted that the far-field speech support 200 may be integrally injection-molded, and the far-field speech support 200 is made of the transparent polycarbonate material. When installing the infrared receiving head assembly 400, the infrared receiving head mounting plate 401 is buckled on the locking plate 2031 and the limiting plate 2034. The limiting groove 2032 and the limiting plate 2034 limit the infrared receiving head mounting plate 401 to move in front, rear, left, and right directions, the first limiting portion 2033 and the second limiting portion 2035 limit the infrared receiving head mounting plate 401 to move in an up-down direction, and the support portion 204 supports the infrared receiving head mounting plate 401, so as to stably install the infrared receiving head mounting plate 401 on the far-field speech support 200. Please refer to FIG. 2, in an embodiment, the support portion 204 is disposed perpendicular to the transparent light guide plate 2011. When an external infrared signal is emitted toward the transparent light guide plate 2011 (please refer to a direction of an arrow in FIG. 4), the reflective mirror surface of the infrared reflective portion 205 reflects the infrared signal to the infrared receiving head 402, so as to achieve a purpose of receiving a remote control signal.

Figure 5:
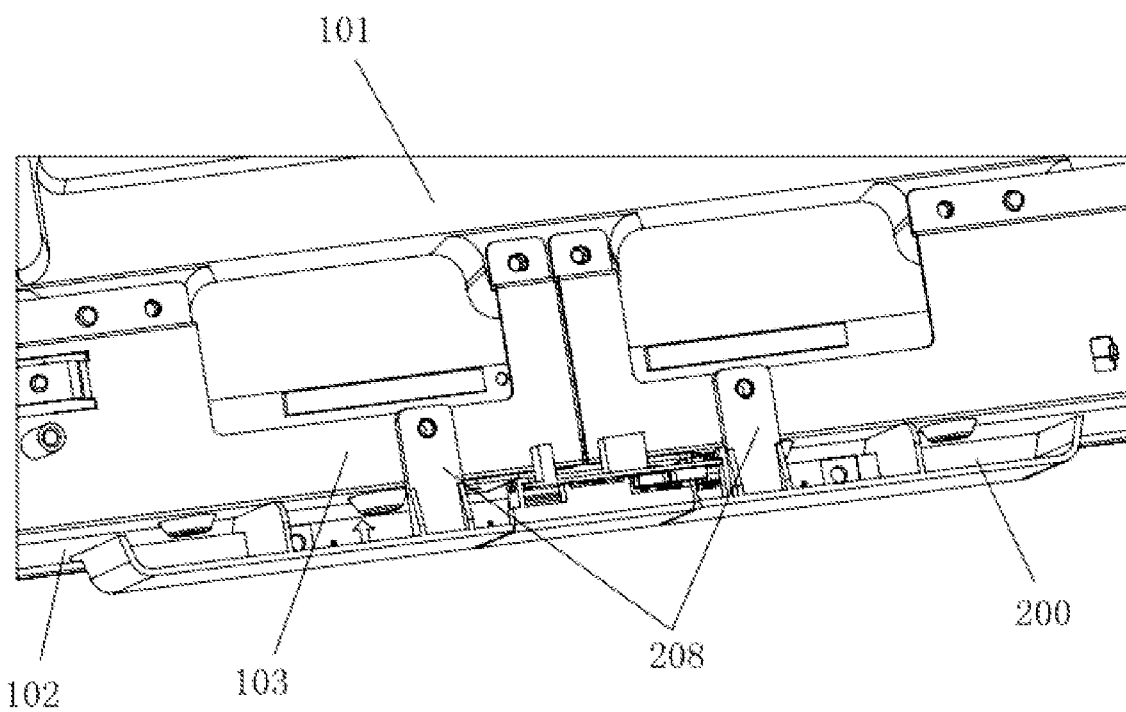
FIG. 5 is a schematic structural diagram showing that the far-field speech support is fixed to a television body according to an embodiment of the present disclosure.

Please refer to FIG. 2 and FIG. 5, in an embodiment, the base 201 is provided with a first fixing portion 206, and the far-field speech board installation portion 202 is provided with a second fixing portion 207. The television 100 further comprises a front frame 102. When the far-field speech support 200 needs to be installed, the far-field speech support 200 is inserted into the front frame 102 of the television 100, and is buckled to the front frame 102 through the first fixing portion 206 and the second fixing portion 207.

Please refer to FIG. 2, FIG. 3, and FIG. 5, in an embodiment, the base 201 is provided with a plurality of third fixing portions 208, and each of the third fixing portions 208 is provided with a second through hole 2081. The television 100 further comprises a source cover plate 103. The second through holes 2081 are screw holes. After the far-field speech support 200 is installed in the front frame 102, the far-field speech support 200 is fixedly connected to the source cover plate 103 of the television 100 by screws through the third fixing portions 208.

In the above, the present disclosure provides a far-field speech support with a lens function and an electrical device. The far-field speech support includes: a base, a far-field speech board installation portion disposed on the base and configured to install a far-field speech board, a transparent light guide plate disposed on a bottom side of the far-field speech board installation portion, a buckle structure disposed on the base and configured to install an infrared receiving head assembly, and an infrared reflective portion disposed corresponding to the transparent light guide plate and disposed below the infrared receiving head assembly. The far-field speech support is integrally formed, and the far-field speech support is made of a transparent polycarbonate material. When an infrared signal enters the far-field speech support, it passes through the transparent light guide plate, and then is reflected to an infrared receiving head through the infrared reflective portion. Therefore, the far-field speech support acts as a lens, which reduces the number of lenses. Furthermore, the far-field speech support provides an installation space for the far-field speech board, which facilitates installation of the far-field speech board.

It should be understood that application of the present disclosure is not limited to the above examples. Those skilled in the art may make improvements or changes based on the above description, and all such improvements or changes shall fall within the scope of the claims of the present disclosure.

What is claimed is:

1. A far-field speech support with a lens function, comprising:
    a base;
    a far-field speech board installation portion disposed on the base and configured to install a far-field speech board;
    a transparent light guide plate disposed on a bottom side of the far-field speech board installation portion;
    a buckle structure disposed on the base and configured to install an infrared receiving head assembly; and
    an infrared reflective portion disposed corresponding to the transparent light guide plate and disposed below the infrared receiving head assembly.

2. The far-field speech support with the lens function according to claim 1, wherein the infrared reflective portion is integrally formed with the transparent light guide plate.

3. The far-field speech support with the lens function according to claim 1, wherein a reflective surface of the infrared reflective portion has an inclined angle with a bottom surface of the transparent light guide plate.

4. The far-field speech support with the lens function according to claim 1, wherein the far-field speech board installation portion is provided with a plurality of first through holes.

5. The far-field speech support with the lens function according to claim 4, wherein the first through holes are configured as microphone holes for the far-field speech board.

6. The far-field speech support with the lens function according to claim 1, wherein the buckle structure is disposed on a side of the base away from the far-field speech board installation portion.

7. The far-field speech support with the lens function according to claim 1, wherein the buckle structure comprises a locking plate and a limiting plate, and the locking plate and the limiting plate are oppositely disposed on the base.

8. The far-field speech support with the lens function according to claim 7, wherein the locking plate is provided with a limiting groove and a first limiting portion, and the limiting plate is provided with a second limiting portion.

9. The far-field speech support with the lens function according to claim 7, wherein the transparent light guide plate is provided with a support portion, the support portion is disposed between the locking plate and the limiting plate, and the support portion is integrally formed with the transparent light guide plate and the infrared reflective portion.

10. The far-field speech support with the lens function according to claim 9, wherein the support portion is disposed perpendicular to the transparent light guide plate.

11. The far-field speech support with the lens function according to claim 9, wherein the transparent light guide plate, the infrared reflective portion, and the support portion are made of polycarbonate.

12. The far-field speech support with the lens function according to claim 1, wherein the transparent light guide plate is disposed at a middle of the base.

13. The far-field speech support with the lens function according to claim 1, wherein the base is provided with a first fixing portion, and the far-field speech board installation portion is provided with a second fixing portion.

14. The far-field speech support with the lens function according to claim 1, wherein the base is provided with a plurality of third fixing portions, and each of the third fixing portions is provided with a second through hole.

15. An electrical device, comprising:
    a far-field speech support with a lens function comprising:
        a base;
        a far-field speech board installation portion disposed on the base;
        a transparent light guide plate disposed on a bottom side of the far-field speech board installation portion;
        a buckle structure disposed on the base; and
        an infrared reflective portion disposed corresponding to the transparent light guide plate and disposed below the infrared receiving head assembly;
    a far-field speech board disposed on the far-field speech board installation portion; and
    an infrared receiving head assembly disposed on the far-field speech support and is connected to the buckle structure.

16. The electrical device according to claim 15, wherein the far-field speech board is adhered to a back surface of the far-field speech board installation portion.

17. The electrical device according to claim 15, wherein the infrared receiving head assembly comprises an infrared receiving head and an infrared receiving head mounting plate, the infrared receiving head mounting plate is disposed on the buckle structure, and the infrared receiving head is disposed on the infrared receiving head mounting plate.

18. The electrical device according to claim 17, wherein the infrared receiving head is disposed directly above the infrared reflective portion.

* * * * *